Dec. 24, 1957   R. C. SANDERS, JR   2,817,240
GYROSCOPE
Filed Nov. 20, 1953
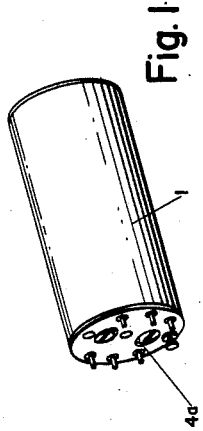
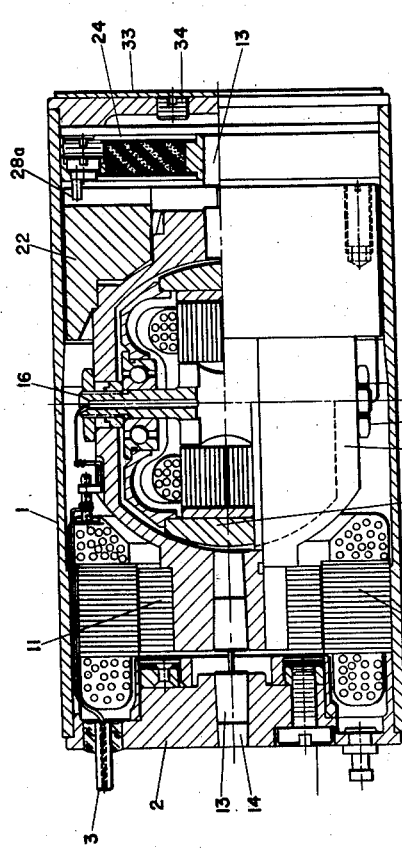
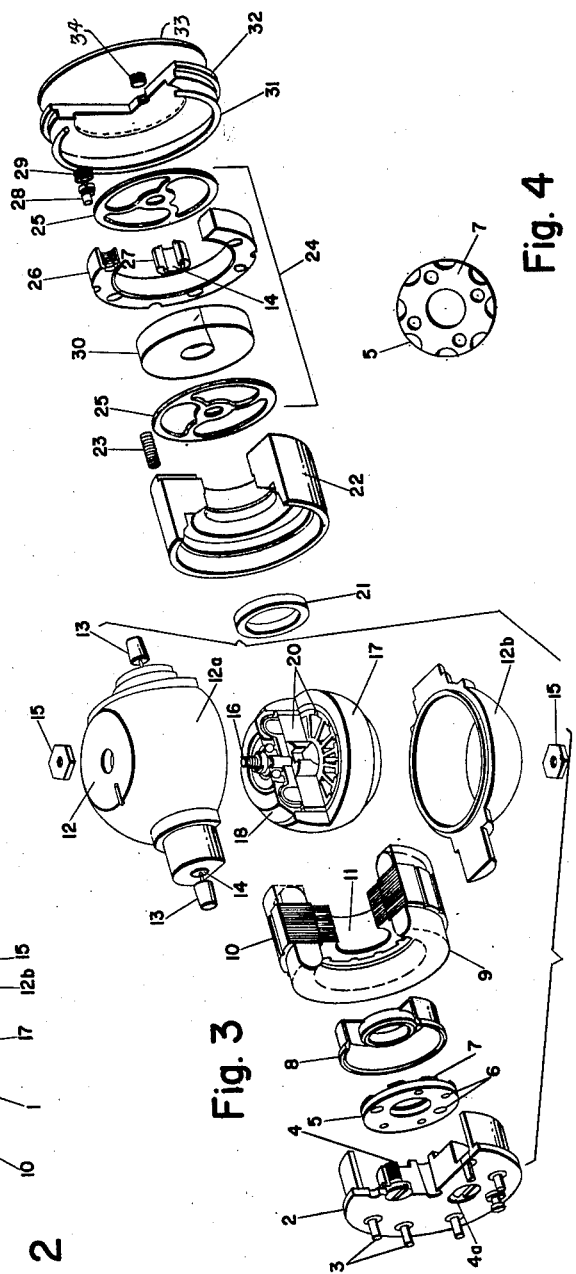
Royden C. Sanders Jr.
INVENTOR.
BY United States Patent Office 2,817,240
Patented Dec. 24, 1957

2,817,240

GYROSCOPE

Royden C. Sanders, Jr., Nashua, N. H., assignor, by mesne assignments, to Sanders Associates, Inc., Nashua, N. H., a corporation of Delaware Application November 20, 1953, Serial No. 393,283

9 Claims. (Cl. 74—5.6)

This invention relates generally to gyroscopes and, more particularly rate gyros, of the type employed in modern aircraft, guided missiles and the like. It is particularly directed to the provision of means for adjusting certain parts, particularly the pick-off components, of a rate gyro, which means are of simple and sturdy construction while being readily accessible.

It is, therefore, an object of the present invention to provide a gyro having improved means for adjusting its response to zero or null signal condition.

Other and further objects will become apparent from the following description.

As is well known to those skilled in the art of designing rate gyros of the type to which the present invention is directed, such gyros produce a signal output even when they are not rotating about their input axis. This may be called the zero or null signal. A part of this null signal results from minor system asymmetries accumulated in the process of manufacture. In the present gyroscope this part is a constant and it is completely compensated for by the null adjustment of the present invention. As will be seen, this adjustment is accomplished entirely externally to the hermetically sealed gyro housing. The adjustment may be accomplished at the factory and once made ordinarily requires no further attention. Its simplicity, of course, allows the adjustment to be made in the field at any time desired.

One of the most troublesome sources of zero signal uncertainty in most conventional rate gyros is that due to bearing friction in the output axis or extraneous torques from the pick-off design. It will be apparent that in the present gyroscope both of these effects are reduced to the obsolute minimum, while practically the sole source of zero uncertainty is due to the internal friction or hysteresis of the torsion bars which support the gyro.

In standard production gyroscopes embodying the present invention, the zero uncertainty signal following full scale swings are less than 0.15 percent of the full scale output. The significance of these figures is, of course, entirely a function of the use that is made of the signal output.

In the gyro hereinafter described all moving bearings are entirely eliminated from the gimbal suspension. The support and the centering of the gimbal are accomplished by means of improved supporting elements or torsion bars which embody an invention described in a copending application. These bars not only provide the required supporting means, but also a restraining torque which resists the motion of the gimbal about the output axis. Friction is essentially completely eliminated from the output shaft suspension.

By virtue of the various features of invention, of the present as well as in copending patent applications, employed in the construction herein described there has been achieved a subminiature gyro, less than one inch in diameter, less than two inches long and weighing only 2.9 ounces. This constitutes the smallest gyro now known to exist and meets or exceeds the performance characteristics of larger rate gyros, yet is capable of lower cost production than other larger available instruments. As stated above, a null adjustment which is simple and accurate may be accomplished by the means provided by the present invention.

In accordance with the present invention there is provided a gyroscope including a housing and a rotor in the housing. A gimbal is provided having supporting means for supporting the rotor along its axis of spin. Affixed to the housing is a suspension for the gimbal to enable its pivotal movement about an output axis perpendicular to the axis of spin. Pick-off means are provided actuated by the gimbal in response to the pivotal movement for developing a signal having an amplitude proportional to the amount of the pivotal movement. The pick-off means include a differential transformer having a movable multi-pole core of ferromagnetic material coupled to the gimbal and a stator affixed to the housing. Null-adjusting core means are disposed adjacent the transformer rotor core, said null-adjusting means being adapted for so adjusting its position relative to the rotor core as to provide a minimum signal when the gimbal is in a neutral pivotal position.

For a more detailed description of the present invention, reference may now be made to the following description taken in connection with the accompanying drawing.

In the drawing, Fig. 1 is a perspective side view of a gyroscope embodying the present invention shown in actual size; Fig. 2 is an enlarged, side elevation view, partly in section, of the gyroscope of the present invention; Fig. 3 is an exploded perspective view, partly in section, of the gyro shown in Figs. 1 and 2; and Fig. 4 is a front view of one of the null adjusting rings of the gyro.

In accordance with the present invention, there is provided a gyroscope which comprises a rotor having a gimbal supporting it for rotation about its axis of spin. A suspension is provided for the gimbal which permits its pivotal movement about a line perpendicular to said axis of spin. Pick-off means are associated with the gimbal and actuated thereby in response to its pivotal movement. These means develop a signal having an amplitude proportional to the amount of the pivotal movement of the gimbal. There is associated with these pick-off means an arrangement for adjusting them to provide a minimum signal when the gimbal is in its neutral pivotal position. These means comprise an arrangement for adjusting a part of the laminations of a differential transformer which constitutes the actual pick-off structure associated with the gimbal. Thus, changes in reluctance of the transformer caused by the pivotal movement of the gimbal produce a signal which varies with the amount of the gimbal movement.

Referring now more particularly to the drawing, the gyro embodying the present invention is shown comprising a housing 1 of generally cylindrical form having attached at one end a cap 2 which may be mounted in any suitable place.

Provided in the end cap 2 are leads 3 and null adjusting screws 4 which form a part of the structure of the present invention as will hereinafter be more fully explained. The screws are inserted in their respective threaded holes in an adjusting ring 5 through the elongated slots 4a in the end cap, which slots permit a limited amount of lateral movement of the screws. The null adjusting ring 5 is provided adjacent to the end cap 2 with screw or rivet holes 6 and pick-off adjustment elements or laminations 7, as shown. A sealing ring 8 is disposed at the opposite side of ring 5 with its outer rim surrounding the ring 5 and extending into the cap 2. This is followed by pick-off transformer 9 comprising a pick-off stator 10 and rotor 11, as shown.

The gimbal 12 is disposed, in the central portion of housing 1, as shown in Fig. 2, and comprises the split upper and lower sections 12a and 12b which are shown in detail in Fig. 3.

Torsion bars 13 are disposed at opposite ends of the gimbal. They comprise a narrow central portion which supplies the spring restraint and enlarged integral end portions which provide rigid and strong supports. The end portions of the bars are tapered and the supports 14 of the gimbal, the end cap 2, and the hub or mount 27 of the S-spring assembly, presently to be described, are correspondingly tapered. They ensure the strong rigid support of the gimbal while permitting its rotative movement about the output axis. The torsion bars, as mentioned, also afford the restraining torque which resists their angular movement about the output axis and returns the gimbal and rotor to their normal relative angular positions immediately after the input force to the gyro has been removed. Friction is thus essentially eliminated from the output axis of the gyro.

The nuts 15 at the top and bottom of the gimbal sections secure the shaft 16 in position. Retainers with bearings are disposed at each end of the rotor shaft which provides a symmetrical, balanced, non-cantilever type of rotor support, which feature forms a part of a copending patent application. Caps 18 are provided for the rotor at each end thereof. The two sections of the gimbal are retained by ring 21 and pick-off rotor 11. An annular temperature compensator member 22, in which balance screws 23 may be secured, one being shown in Fig. 3, is disposed at one end of the gimbal 12.

For the purpose of preventing special strain on the torsion bars by different rates of expansion of the parts within the gyro, with temperature changes, there is provided an S-spring assembly 24 at one end of the housing. This assembly comprises a pair of S springs 25 disposed on opposite sides of a ring member 26. A hub element 27 provides the torsion bar tapered mounting 14, as previously mentioned, and an output axis stop pin 28 and lock 29 are provided as indicated. Within the ring 26 an annular pressure compensator 30 is disposed. An O ring or gasket 31, a housing-cap 32, and name plate 33 are secured, in the order named, at the S-spring end of the housing.

The S-spring assembly, above described, permits the movable parts of the assembly to be relatively free for longitudinal movement, while remaining rigidly fixed for transverse forces. Among its other advantages, this arrangement, as above pointed out, compensates for strains caused by the different rates of expansion of the parts within the gyro relative to housing.

Another feature of the present gyro, which is covered by a copending application, is pressure compensation within the housing. The housing or case is completely filled with a suitable fluid, such as oil, through the plug 34 in housing-cap 32. Under temperature cycling, different rates of expansion of the fluid and the housing are occasioned. The differences in expansion are compensated for by the provision of the annular member 30 which is disposed within the S-spring assembly. This member 30 is of a cellular material containing a gas or air, which is compressible and thus compensates for any relative change in volume occasioned by the differences between the expansion of fluid with increased temperature and the expansion of the housing with such change. Without such compensation, leakage or failure of the gyro would result.

In order to maintain the stability of the instrument, the fluid in the housing provides a damping of the movement of the gimbal about output axis. Also, the gimbal being immersed in the fluid is given a partially buoyant support which has the effect of reducing its sensitivity to linear acceleration and shock.

The damping member 22 is constructed of a suitable material which expands with increasing temperature, reducing the gap between it and the housing. It thus increases the shearing damping action of the fluid so as to compensate for its reduction due to the loss of viscosity of the fluid with temperature increases. A small viscosity variation of the damping fluid with temperature over a wide range and the above-mentioned compensation permits opeartion of the gyro with a minimum of damping variations down to extremely low temperatures, without requiring the use of external heaters to stabilize the damping fluid temperature. The damping fluid employed for the present gyro has this small viscosity variation with temperature characteristic.

Referring again to the null adjusting feature of the present invention, the pick-off adjusting elements 7, as shown more particularly in Fig. 4, actually constitute a part of the laminations of the pick-off rotor 11, which are adjustable, with respect to the other laminations. In this embodiment three of these laminations are secured as shown to the adjusting ring 5 and the null adjusting screws 4 extend, as above described, through the elongated slots 4a in cap 2, engaging the threaded holes therefor in the ring 5. Obviously, by loosening the screws the ring 5 and its laminations may be rotated and adjusted by the rotative movement relative to the other laminations of the pick-off rotor 11. It will be seen that such movement of the laminations varies the reluctance of the differential transformer of the pick-off elements, thereby adjusting the null point so that the signal output from the gyro is a minimum when the gyro gimbal 12 is at its normal unrotated position.

It will be seen that the pick-off here provided is basically a differential transformer. The mutual inductance between the primary and secondary of this transformer is varied with the relative angular position of the core laminations. This in turn is effected by the rotation of the output shaft. Thus, this movement of the rotor 11 and laminations attached thereto is translated into an electrical signal which is proportional to and phase sensitive or directly responsive to input angular velocity. The reluctance of the transformer is varied by the adjustment of this part of the core laminations or adjusting elements 7 relative to the other laminations of the rotor 11 to effect the desired null adjustment.

The gyro of the present invention, utilizing the improved features described above, has in practice achieved a resolution of better than 1 part in 10,000 over the full output range and linearity of better than 0.1 percent for input angular velocities up to one-half of full scale output, with linearity of better than one percent for input velocities greater than one-half of full scale output.

While there has been shown and described a particular embodiment of the present invention, it will be apparent to those skilled in the art that various changes and modifications may be made without departing from the spirit of the invention, and it is therefor intended in the appended claims to cover all such changes and modifications as fall fairly within the spirit and scope of this invention.

What is claimed is:

1. A gyroscope comprising a rotor; a gimbal having supporting means for said rotor coincident to its axis of spin; a suspension for said gimbal permitting its pivotal movement about a line perpendicular to said axis of spin; pick-off means actuated by said gimbal in response to said pivotal movement for developing a signal having an amplitude proportional to the amount of said pivotal movement including a transformer having one of its elements connected to said gimbal and having a plurality of core laminations providing poles; and means for adjusting the relative positions of certain of said laminations relative to others to so adjust said poles as to provide a minimum signal when said gimbal is in a neutral pivotal position.

2. A gyroscope comprising a rotor; supporting means for said rotor providing two degrees of freedom; a differential transformer having core laminations adjacent to said rotor, for translating movement thereof angularly to its axis of spin into an electrical signal proportional to said movement; and means for so adjusting a part of said laminations relative to other of said laminations as to effect a minimum signal when said rotor is in an angularly neutral position.

3. A gyroscope comprising a rotor; a gimbal having supporting means for said rotor coincident to its axis of spin; a suspension for said gimbal permitting its pivotal movement about a line perpendicular to said axis of spin; a transformer including core laminations determining the reluctance thereof carried by said gimbal and windings carried by said suspension whereby changes in said reluctance caused by pivotal movement of said gimbal produces a signal varying with the amount of gimbal movement; additional laminations adjustable with respect to the first said laminations to vary the response of said transformer; and means for adjusting the relative positions of said additional laminations with respect to the first said laminations to adjust said response of said transformer and determine its minimum response when said gimbal is in a neutral pivotal position.

4. A gyroscope comprising a housing; a rotor in said housing; supporting means for said rotor providing two degrees of freedom of movement thereof; means for translating movement of said rotor angularly to its axis of spin into a signal proportional to said movement; means for sealing a chamber within said housing containing said rotor and said translating means; and means disposed adjacent said sealing means outside of said chamber for adjusting said translating means from without said chamber without physically penetrating said seal to effect a minimum signal when said rotor is in an angularly neutral position with respect to said housing.

5. A gyroscope comprising a housing; a rotor in said housing; supporting means for said rotor providing two degrees of freedom of movement thereof; a variable reluctance transformer for translating movement of said rotor angularly to its axis of spin into a signal proportional to said movement; means for sealing a chamber within said housing containing said rotor and said translating means; and magnetically permeable means disposed adjacent said sealing means outside of said chamber for adjusting said reluctance of said transformer from without said chamber without physically penetrating said seal to effect a minimum signal when said rotor is in an angularly neutral position with respect to said housing.

6. A gyroscope comprising a housing; a rotor in said housing; supporting means for said rotor providing two degrees of freedom of movement thereof; a variable reluctance transformer for translating movement of said rotor angularly to its axis of spin into a signal proportional to said movement; means for sealing a chamber within said housing containing said rotor and said translating means; magnetically permeable means disposed adjacent said sealing means outside of said chamber for adjusting said reluctance of said transformer from without said chamber without physically penetrating said seal to effect a minimum signal when said rotor is in an angularly neutral position with respect to said housing; and elements connected with said adjusting means extending through said housing and accessible from the outside thereof for effecting said adjustment.

7. A gyroscope, comprising: a housing; a rotor in said housing; supporting means for said rotor providing two degrees of freedom of movement thereof; a variable reluctance transformer for translating movement of said rotor angularly to its axis of spin into a signal proportional to said movement; means for sealing a chamber within said housing containing said rotor and said translating means, said sealing means having the configuration of a ferrule-flanged diaphragm; and magnetically permeable means disposed adjacent said sealing means outside of said chamber for adjusting said reluctance of said transformer from without said chamber without physically penetrating said seal to effect a minimum signal when said rotor is in an angularly neutral position with respect to said housing.

8. A gyroscope, comprising: a housing; a rotor in said housing; a gimbal having supporting means for supporting said rotor along its axis of spin; a suspension affixed to said housing for said gimbal to enable its pivotal movement about an output axis perpendicular to said axis of spin; pick-off means actuated by said gimbal in response to said pivotal movement for developing a signal having an amplitude proportional to the amount of said pivotal movement including a differential transformer having a multi-pole rotor core of ferromagnetic material carried by said gimbal and a stator affixed to said housing; and null-adjusting core means disposed adjacent said transformer rotor core, said null-adjusting core means being adapted for so adjusting its position relative to said rotor core as to provide a minimum signal when said gimbal is in a neutral pivotal position.

9. A gyroscope, comprising: a housing; a rotor in said housing; a gimbal having supporting means for supporting said rotor along its axis of spin; a suspension affixed to said housing for said gimbal to enable its pivotal movement about an output axis perpendicular to said axis of spin; pick-off means actuated by said gimbal in response to said pivotal movement for developing a signal having an amplitude proportional to the amount of said pivotal movement including a differential transformer having a circumferentially disposed, multi-pole rotor core of ferromagnetic material carried by said gimbal and a stator affixed to said housing; and null-adjusting core means affixed to said housing and disposed adjacent said transformer rotor core, said null-adjusting means being adapted for so adjusting its position relative to said rotor core as to provide a minimum signal when said gimbal is in a neutral pivotal position.

References Cited in the file of this patent
UNITED STATES PATENTS

| | | |
|---|---|---|
| 2,537,844 | Meredith | Jan. 9, 1951 |
| 2,563,983 | Watson | Aug. 14, 1951 |
| 2,672,054 | Warren et al. | Mar. 6, 1954 |